United States Patent
Kim et al.

(10) Patent No.: US 7,131,734 B2
(45) Date of Patent: *Nov. 7, 2006

(54) PROJECTION SYSTEM USING SPATIAL FILTER

(75) Inventors: Dae-sik Kim, Suwon-si (KR); Kun-ho Cho, Suwon-si (KR); Sung-ha Kim, Seoul (KR); Hee-joong Lee, Anyang-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 38 days.

This patent is subject to a terminal disclaimer.

(21) Appl. No.: 10/805,479

(22) Filed: Mar. 22, 2004

(65) Prior Publication Data

US 2004/0239881 A1    Dec. 2, 2004

Related U.S. Application Data

(60) Provisional application No. 60/455,857, filed on Mar. 20, 2003.

(30) Foreign Application Priority Data

Mar. 20, 2003   (KR) ...................... 10-2003-0017415

(51) Int. Cl.
*G03B 21/14* (2006.01)
*H04N 9/14* (2006.01)

(52) U.S. Cl. ........................... 353/97; 353/31; 353/88; 348/742

(58) Field of Classification Search ................... 353/28, 353/84–93, 97, 102, 31; 349/61, 62, 7; 348/742, 348/473
See application file for complete search history.

(56) References Cited

U.S. PATENT DOCUMENTS

| | | | | | |
|---|---|---|---|---|---|
| 5,053,934 | A | * | 10/1991 | Krebs | 362/281 |
| 6,288,815 | B1 | * | 9/2001 | Lambert | 359/196 |
| 6,648,476 | B1 | * | 11/2003 | Watanabe et al. | 353/97 |
| 6,765,705 | B1 | * | 7/2004 | Ouchi | 359/216 |
| 6,854,851 | B1 | * | 2/2005 | Yamasaki et al. | 353/97 |

(Continued)

FOREIGN PATENT DOCUMENTS

EP            0 653 658 A2    5/1995

(Continued)

OTHER PUBLICATIONS

English Language Abstract JP 2001324760; Published Nov. 22, 2001; Minolta Co. Ltd.

(Continued)

*Primary Examiner*—W. B. Perkey
*Assistant Examiner*—Andrew Sever
(74) *Attorney, Agent, or Firm*—Sughrue Mion, PLLC

(57) ABSTRACT

A projection system that can adjust color balance of incident light is provided. The projection system includes a light source, a spatial filter, an optical separator, a scrolling unit, a light valve, and a projecting lens unit. The spatial filter has a slit to adjust a divergent angle or etendue of light emitted from the light source. The optical separator separates light passing through the spatial filter according to color of incident light. The scrolling unit has one or more spiral lens discs, which are formed by spirally arranging cylindrical lens cells, rotate, and scroll color beams separated by the optical separator. The light valve processes light passing through the scrolling unit according to an image signal and forms an image. The projecting lens unit magnifies the image formed on the light valve and projects the magnified image onto a screen.

15 Claims, 15 Drawing Sheets

U.S. PATENT DOCUMENTS

| | | |
|---|---|---|
| 6,877,861 B1 * | 4/2005 | Cho et al. .................... 353/31 |
| 6,877,865 B1 * | 4/2005 | English et al. ................ 353/97 |
| 6,921,171 B1 * | 7/2005 | Lee et al. .................... 353/31 |
| 2001/0038483 A1 | 11/2001 | Lambert |
| 2003/0030776 A1 | 2/2003 | Jeon |
| 2004/0196644 A1 * | 10/2004 | Kim et al. .................... 362/19 |
| 2005/0012904 A1 * | 1/2005 | Kim et al. .................... 353/31 |

FOREIGN PATENT DOCUMENTS

| | | |
|---|---|---|
| EP | 0 723 174 A2 | 7/1996 |
| EP | 1 253 787 A2 | 10/2002 |

OTHER PUBLICATIONS

English Language Abstract JP 11125776; Published Oct. 21, 1997; Fuji Xerox Co. Ltd.

* cited by examiner

PROJECTION SYSTEM USING SPATIAL FILTER

BACKGROUND OF THE INVENTION

This application claims the priority of Korean Patent Application No. 2003-17415, filed on Mar. 20, 2003, in the Korean Intellectual Property Office, and the benefit of U.S. Patent Provisional Application No. 60/455,857, filed on Mar. 20, 2003, in the U.S. Patent Trademark Office, the disclosures of which are incorporated herein in their entirety by reference.

1. Field of the Invention

An apparatus consistent with the present invention relates to a projection system and, more particularly, to a projection system that can adjust color balance by adapting the areas of color bars using a spatial filter.

2. Description of the Related Art

Projection systems are classified into three-panel projection systems and single-panel projection systems according to the number of light values which control the on/off operation of light emitted from a high-output lamp on a pixel-by-pixel basis and form an image. Single-panel projection systems include a smaller optical device than three-panel projection systems, but have an optical efficiency equal to ⅓ of that of the three-panel projection systems. This is because they use a sequential method to separate a red beam R, a green beam G, and a blue beam B of white light. Hence, attempts to increase the optical efficiency of single-panel projection systems have been made.

In a general single-panel projection system, light irradiated from a white light source is separated into R, G, and B beams using color filters, and the three color beams are sequentially sent to a light valve. The light valve appropriately operates according to the sequence of the color beams received and creates images. As described above, the single-panel optical system sequentially uses color beams so that the light efficiency is reduced to ⅓ of that of a three-panel optical system. A scrolling method has been proposed to solve this problem. According to the color scrolling method, white light is separated into R, G, and B beams, and the three color beams are sent to different locations on a light valve. Further, since an image cannot be produced until all of R, G, and B beams for each pixel reach the light valve, R, G, and B color bars are moved at a constant speed in a particular method.

In a conventional single-panel scrolling projection system, as shown in FIG. 1, white light emitted from a light source 100 passes through first and second lens arrays 102 and 104, a polarizing beam splitter array 105, and a condenser lens 107, and is separated into R, G, and B beams by first through fourth dichroic filters 109, 112, 122, and 139. To be more specific, the red beam and the green beam, for example, are transmitted by the first dichroic filter 109 and travel along a first optical path L1, while the blue beam B is reflected by the first dichroic filter 109 and travels along a second optical path L2. The red beam R and the green beam G on the first optical path L1 are separated by the second dichroic filter 112. The second dichroic filter 112 transmits the red beam R along the first optical path L1 and reflects the green beam G along a third optical path L3.

As described above, the light emitted from the light source 100 is separated into the red beam R, the green beam G, and the blue beam B. The R, G, and B beams pass through first through third scrolling prisms 114, 135, and 142, respectively, thereby performing a scrolling operation. The first through third scrolling prisms 114, 135 and 142 are disposed on the first through third optical paths L1, L2, and L3, respectively, and rotate at a uniform speed such that R, G, and B color bars on a surface of a light valve 130 are scrolled. The green beam G and the blue beam B that travel along the second and third optical paths L2 and L3, respectively, are transmitted and reflected by the third dichroic filter 139, respectively, and then combined. Finally, the R, G, and B beams are combined by fourth dichroic filter 122. The combined beam is transmitted by a polarizing beam splitter 127 and forms an image using the light valve 130

The scrolling of the R, G, and B color bars due to rotation of the first through third scrolling prisms 114, 135, and 142 is shown in FIG. 2. Scrolling represents the movement of color bars formed on the surface of the light valve 130 when scrolling prisms corresponding to colors are synchronously rotated.

The light valve 130 processes image information according to an on/off signal for each pixel and forms an image. The formed image is magnified by a projecting lens (not shown) and projected onto a screen.

Since such a method is performed using an optical path provided for each color, an optical path correction lens must be provided for each color, and a component for re-collecting separated light beams must be provided for each color. Accordingly, an optical system is large, and yield is degraded due to a complicated manufacturing and assembling process. In addition, a large amount of noise is generated due to the driving of three motors for rotating the first through third scrolling prisms 114, 135, and 142, and the manufacturing costs of a conventional projection system adopting the above-described method is increased compared to a color wheel method adopting only a single motor.

In order to produce a color image using a scrolling technique, color bars as shown in FIG. 2 must be moved at a constant speed. The conventional projection system must synchronize a light valve with three scrolling prisms in order to achieve scrolling. However, it is not easy to control the synchronization. Further, because the scrolling prisms 114, 135, and 142 make circular motions, the color scrolling speed by the three scrolling prisms is irregular, consequently deteriorating the quality of an image.

The width of each of the color bars is determined according to the width of the beams traveling along the optical paths L1, L2, and L3. If the width of the beams traveling along the optical paths L1, L2, and L3 is narrow, the width of each of the color bars is narrow, and black bars K between the color bars are formed as shown in FIG. 3A. On the contrary, if the width of the beams traveling along the optical paths L1, L2, and L3 is wide, the width of each of the color bars is wide, and overlapping portions P of the color bars are generated as shown in FIG. 3B.

Such black bars K or overlapping portions P deteriorate the quality of a color image. This phenomenon may be explained using the etendue (E).

The etendue (E) denotes an optical conservation physical quantity in any optical system and is given by Equation 1:

$$E = \pi A \sin^2(\theta_{1/2}) = \frac{\pi A}{(4F/No)^2} \quad (1)$$

wherein A denotes the area of an object whose etendue is to be measured, $\theta_{1/2}$ denotes half of an incident angle or an emitting angle of a light beam incident or emitted on the area A, and F/No denotes the F-number of lenses used in the optical system. The relationship equation, $$\sin(\theta_{1/2}) = \frac{1}{(4F/No)}$$

is obtained from Equation 1. According to Equation 1, the etendue (E) is determined by the area of the object and the incident angle of the incident beam or the F-number of lenses. The etendue (E) denotes a physical quantity that depends on the geometric structure of an optical system. The etendeu (E) at the starting point of the optical system must be equal to that at the ending point thereof in order to obtain an optimal light efficiency. That is, the etendue (E) must be conserved from the starting point to the ending point of the optical system. If the etendue at the starting point is less than that at the ending point, the area of the object A in Equation 1 is great when F/No is constant. On the contrary, if the etendue at the staring point is greater than that at the ending point, the area of the object A in Equation 1 is reduced so that light loss may be generated.

Here, when the starting point of the optical system is considered as a light source and the object is considered as a light valve, if the etendue (E) of the light source is greater than that of the optical system, the area of the color bars increases so that the colors are mixed at boundary portions between the color bars. On the contrary, if the etendue (E) of the light source is less than that of the optical system, the area of the color bars is reduced so that black bars K are generated between the color bars. The black bars K or the mix of the colors deteriorate the quality of a color image.

However, the black bars K need to be generated in a special case. For example, in a case where an LCD is used as the light valve 130, it may be difficult to sequentially process an image signal for each of the color bars. That is, when the color bars are scrolled sequentially, an image signal is changed according to the change of the color bars, making it difficult to sequentially process the changed image signal. In such a case, the black bars need to be generated between the color bars in order to produce time delay necessary for processing the changed image signal.

As described above, in the optical system which produces an image using the scrolling method, since the width of the color bars is required to be occasionally adjusted, means for adjusting the width of the color bars must be provided.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

An apparatus consistent with the present invention provides a small-sized projection system which has an improved optical efficiency due to forming a color image via scrolling operation of color bars, the color image having an improved quality due to adjusting the widths of the color bars using a spatial filter.

According to an exemplary embodiment of the present invention, there is provided a projection system comprising a light source. A spatial filter has a slit to adjust a divergent angle or etendue of light emitted from the light source. An optical separator separates light passing through the spatial filter according to color, and a scrolling unit having one or more spiral lens discs which are formed by spirally arranging cylindrical lens cells, which rotates, and scrolls color beams separated by the optical separator. A light valve, which processes light passing through the scrolling unit according to an image signal, forms an image, and a projecting lens unit, which magnifies the image formed on the light valve, projects the magnified image onto a screen.

The projection system according to the present invention further comprises one or more trim filters which have a slit having a width less than a width of the slit of the spatial filter or a glass.

According to the present invention, the optical separator includes first, second, and third dichroic filters which transmit and reflect incident light according to color and which are disposed aslant at different angles.

According to another aspect of the present invention, the optical separator includes first, second, and third dichroic prisms having first, second, and third dichroic filters, respectively, which transmit and reflect incident light according to color.

According to another aspect of the present invention, the optical separator includes first and second polarizing beam splitters which are disposed in up and down directions in front of the first dichroic prism and transmit and reflect incident light according to polarization direction; and a half-wavelength plate which is disposed between the first polarizing beam splitter and the first dichroic prism and changes a polarization direction of polarized light.

According to another aspect of the present invention, the scrolling unit includes first and second spiral lens discs which are disposed to be spaced apart from each other by a predetermined distance, and a glass rod disposed between the first and second spiral lens discs.

According to another aspect of the present invention, there is provided a projection system comprising a light source. A spatial filter has a slit to adjust a divergent angle or etendue of light emitted from the light source. A scrolling unit having one or more spiral lens discs, which are formed by spirally arranging cylindrical lens cells, that rotate, and scroll incident light. An optical separator includes first, second, and third dichroic filters which are disposed to be parallel to one another and separate light passing through the scrolling unit according to color by transmitting and reflecting incident light according to color. Also, a light valve, which processes light passing through the optical separator according to an image signal, forms an image signal and forms an image. A projecting lens unit, which magnifies the image formed on the light valve, projects the magnified image onto a screen.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF ILLUSTRATIVE, NON-LIMITING EMBODIMENTS OF THE INVENTION

Figure 1:
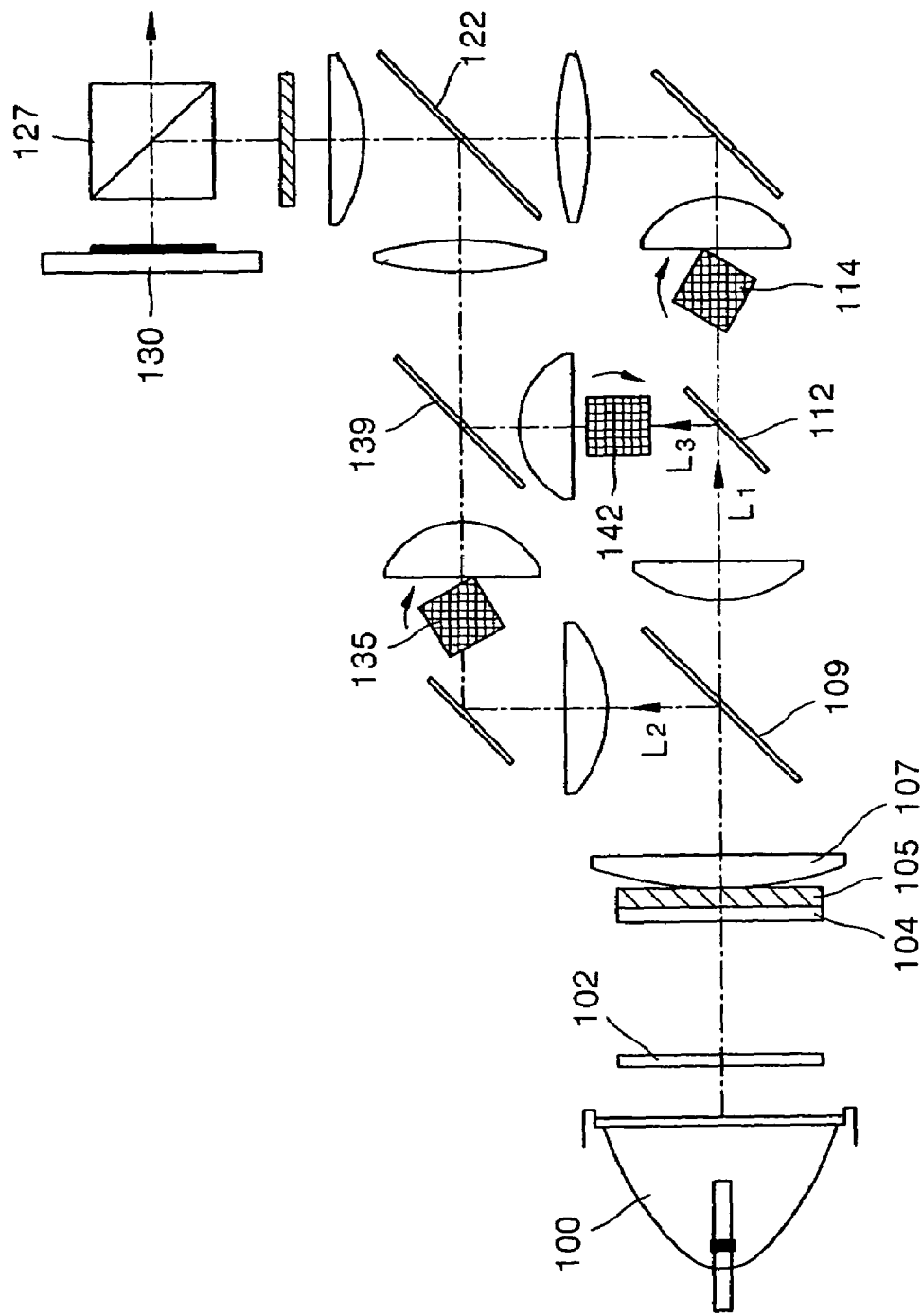
FIG. 1 shows a conventional projection system.
Figure 2:
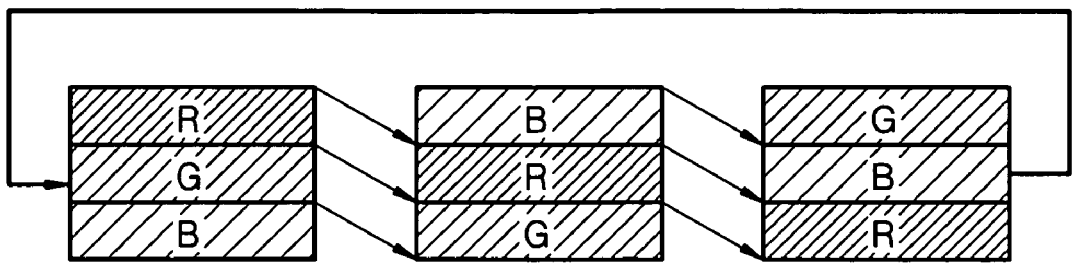
FIG. 2 illustrates a color scrolling operation of the conventional projection system.
Figure 3A:
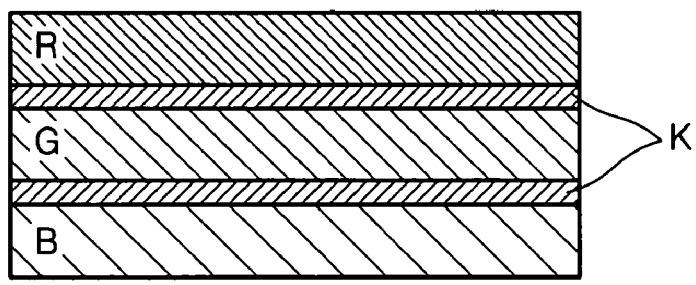
FIG. 3A shows a black bar formed between color bars.
Figure 3B:
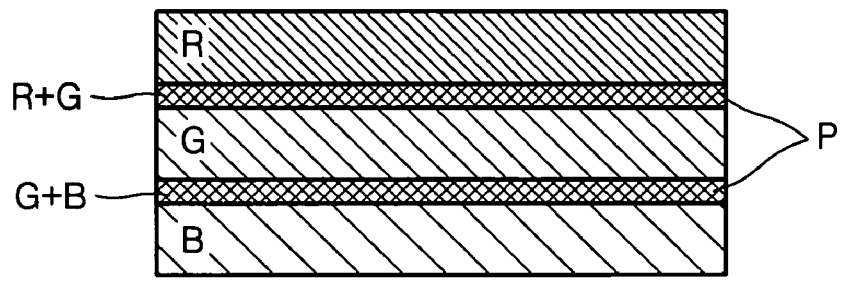
FIG. 3B shows color bars overlapped at a boundary portion therebetween in the conventional projection system.

The present invention will now be described more fully with reference to the accompanying drawings, in which illustrative, non-limiting embodiments of the invention are shown. In the drawings, like reference numbers refer to like elements throughout, and the sizes of elements may be exaggerated for clarity.

Figure 4:
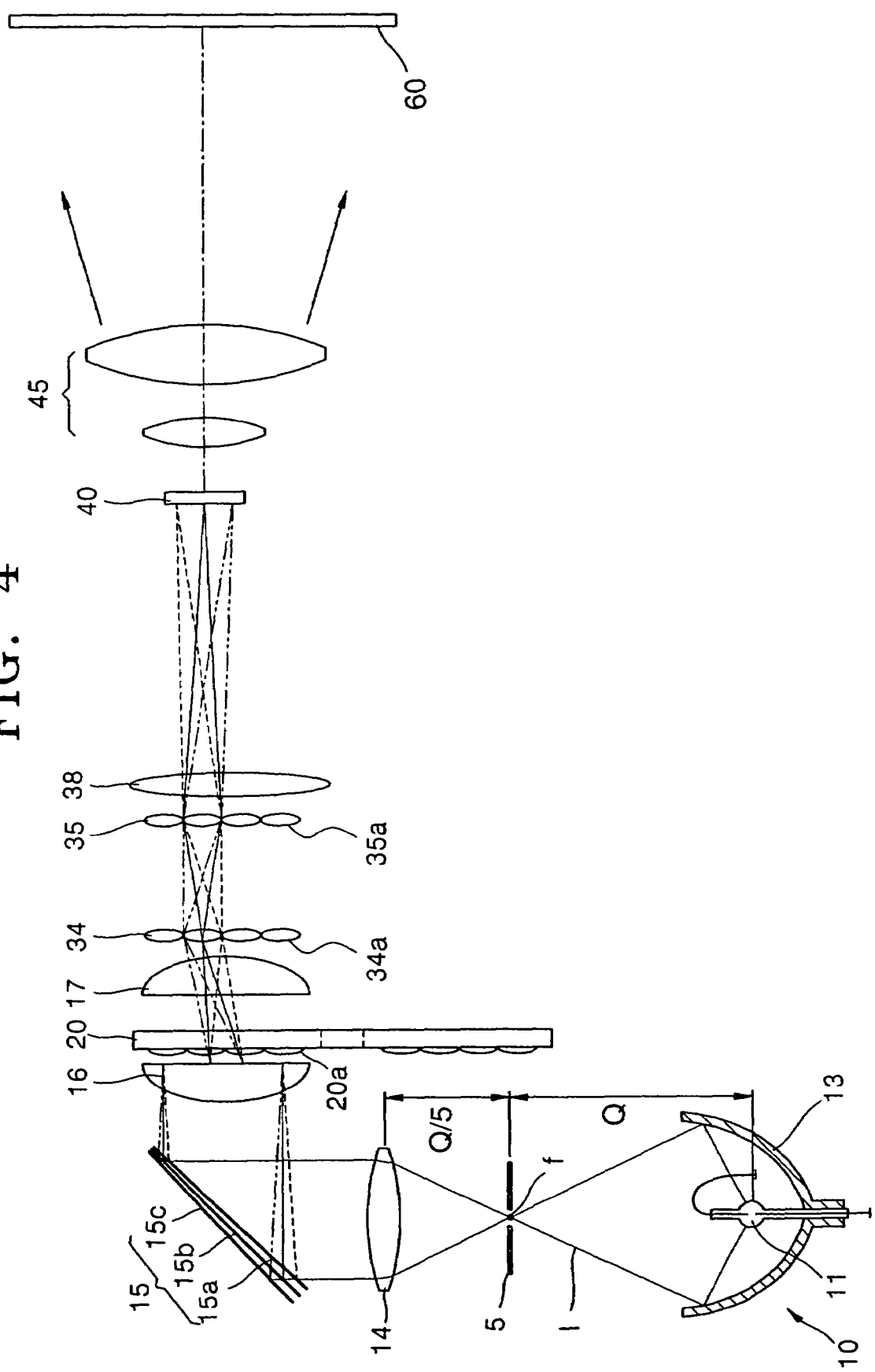
FIG. 4 illustrates the schematic structure of a projection system according to a first embodiment of the present invention.

Referring to FIG. 4, a projection system according to a first embodiment of the present invention includes a light source 10, a spatial filter 5, an optical separator 15, a scrolling unit 20, a light valve 40, and a projecting lens unit 45. The optical separator 15 separates light I emitted from the light source 10 according to wavelength. The scrolling unit 20 scrolls a red beam R, a green beam G, and a blue beam B which are separated using the optical separator 15. The spatial filter 5 is disposed between the light source 10 and the scrolling unit 20. The light valve 40 processes the beams scrolled by the scrolling unit 20 according to an image signal and forms an image. The image formed on the light valve 40 is magnified by the projecting lens unit 45 and projected onto a screen 60.

The light source 10 emits white light and includes a lamp 11 for producing light and a reflecting mirror 13 for reflecting light emitted from the lamp 11 and guiding a travelling path of the light. The reflecting mirror 13 may be an elliptic mirror in which a position of the lamp 11 is a first focal point and a point where light is focused is a second focal point. Further, the reflecting mirror 13 may be a parabolic mirror in which a position of the lamp 11 is a focal point and which makes light, which is emitted from the lamp 11 and is reflected from the reflecting mirror 13, into parallel light. In FIG. 4, an elliptic mirror is used as the reflecting mirror 13. In a case where a parabolic mirror is used as the reflecting mirror 13, a lens focusing for light must be provided.

A collimating lens 14 is disposed on an optical path between the light source 10 and the optical separator 15 and makes incident light thereon into parallel light. When a distance between the light source 10 and a focal point f where the light emitted from the light source 10 is focused is denoted by Q, it is preferable that the collimating lens 14 is disposed to be spaced apart from the focal point f by a distance of Q/5. An optical system can be made compact due to the above-described disposition.

Figure 5:
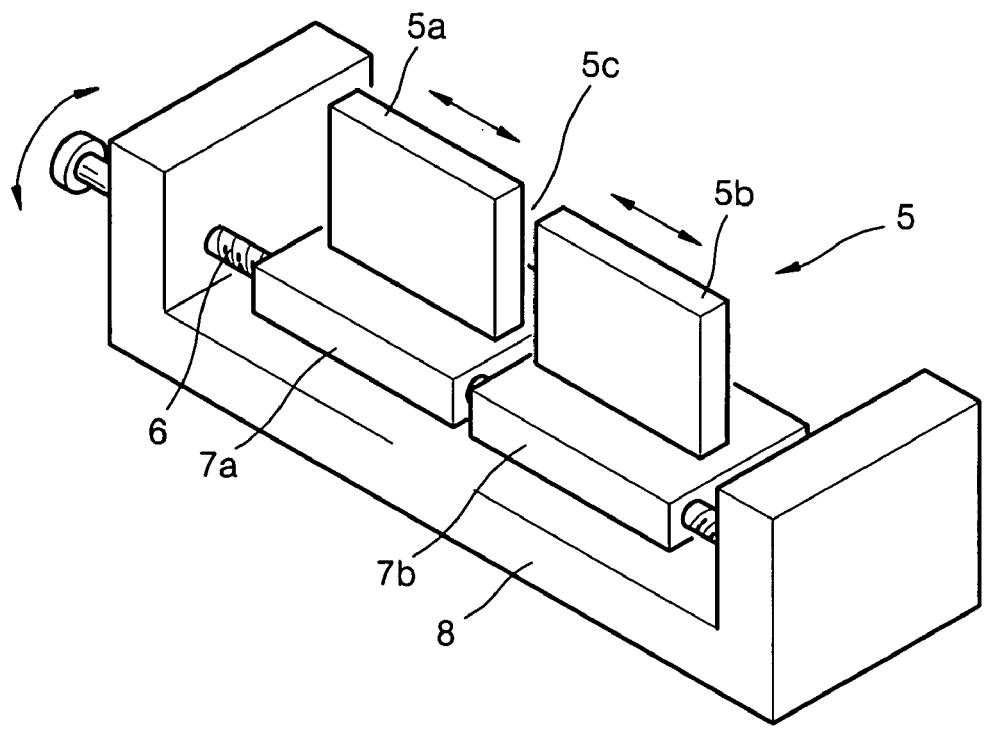
FIG. 5 illustrates a first example of a spatial filter, in which the width of a slit can be adjusted, used in the projection system according to the first embodiment of the present invention.

The spatial filter 5 is disposed between the light source 10 and the collimating lens 14. It is preferable that the spatial filter 5 is disposed at the focal point f of the reflecting mirror 13. The spatial filter 5 is configured such that the width of a slit thereof can be adjusted. For example, as shown in FIG. 5, the spatial filter 5 includes a first filter surface 5a, a second filter surface 5b separated from the first filter surface 5a, first and second support plates 7a and 7b which support the first and second filter surfaces 5a and 5b, respectively, and are movable by a transfer screw 6 and a frame 8 which rotatably supports the transfer screw 6. When the transfer screw 6 rotates, the first and second support plates 7a and 7b move along the transfer screw 6 so that the width of a slit 5c formed between the first and second filter surface 5a and 5b is adjusted. It is preferable that the width of the slit 5c is adjusted in a color beam separating direction or a color beam scrolling direction.

Figure 6A:
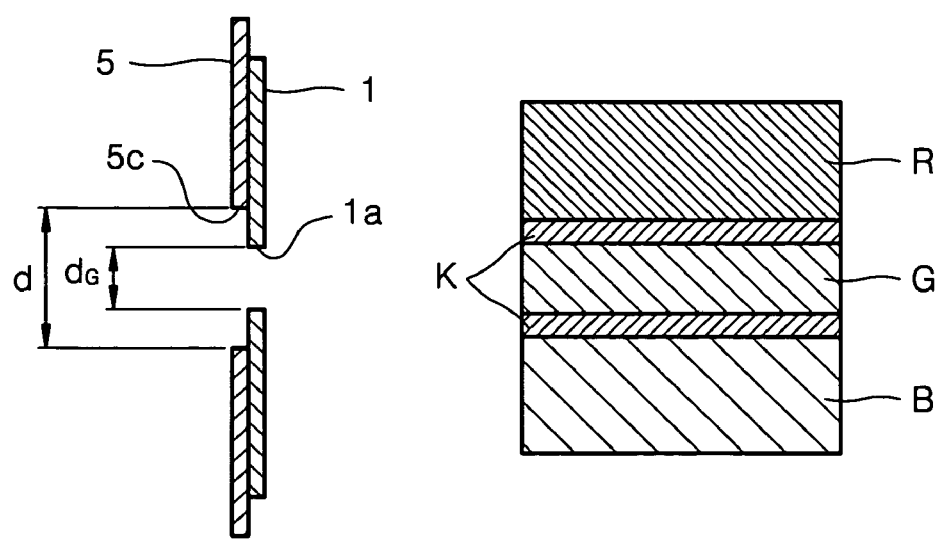
FIGS. 6A through 6C illustrate examples of a combination of the spatial filter and a trim filter used in the projection system according to the first embodiment of the present invention.
Figure 6B:
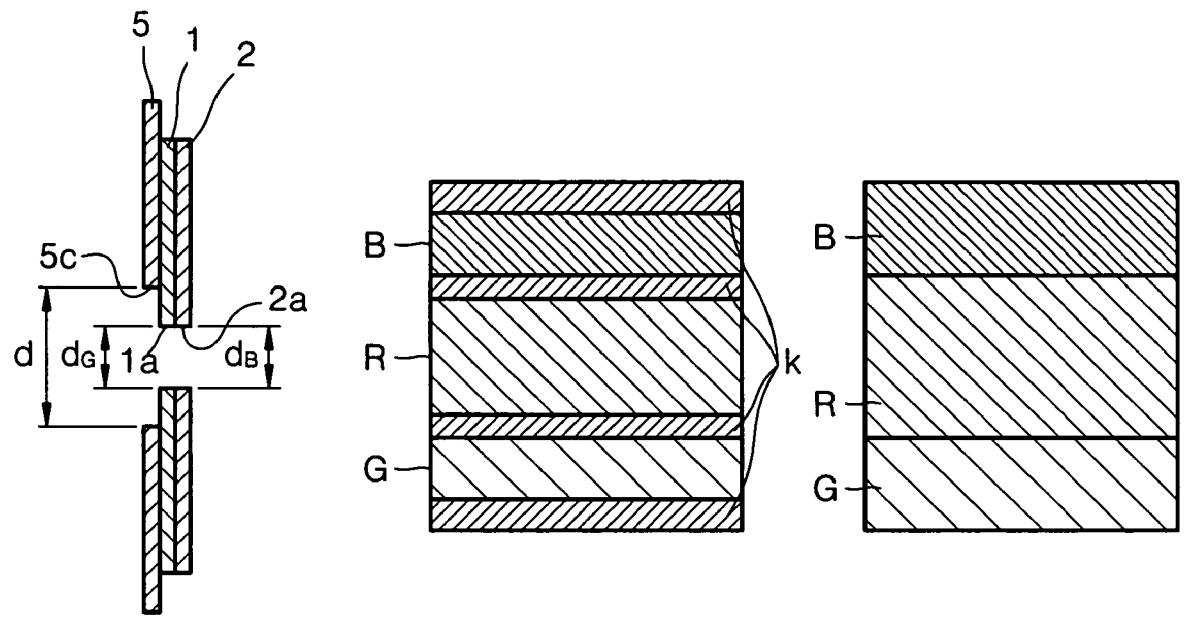
Figure 6C:
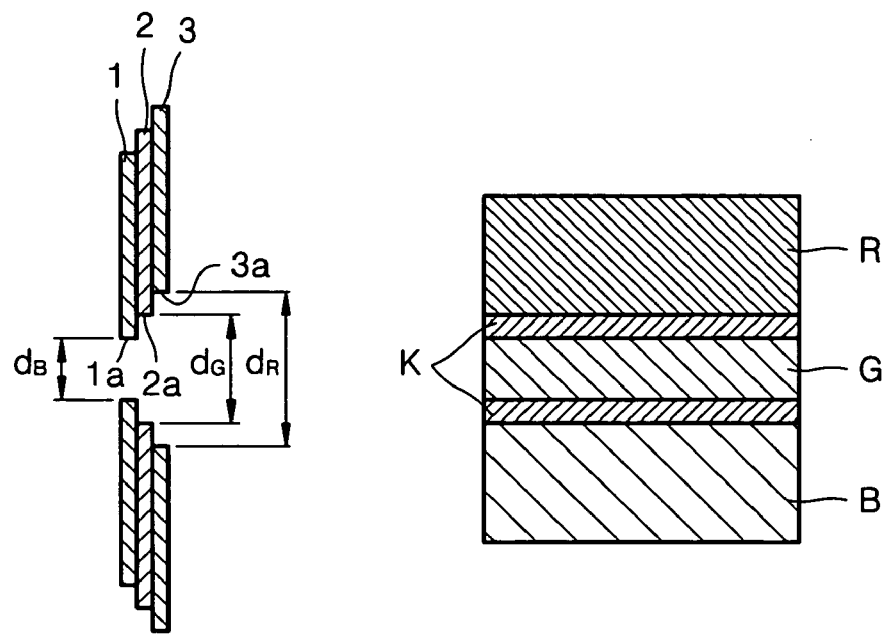

As shown in FIGS. 6A through 6C, one or more trim filters which gave a slit to adjust the area of the color bars may be further provided with the spatial filter 5. In FIG. 6A a first trim filter 1 is attached to the spatial filter 5. For example, the first trim filter 1 reflects a red beam and transmits remaining beams. A slit 1a of the first trim filter 1 can transmit all colors. In FIG. 6B, the first trim filter 1 and a second trim filter 2 are attached to the spatial filter 5. In FIG. 6C, the first trim filter 1, the second trim filter 2, and a third trim filter 3 are provided without the spatial filter 5. The first, second, and third trim filters 1, 2, and 3 may be manufactured by coating a filter on the spatial filter 5 or a separate glass, or may be manufactured using a separate filter plate.

Here, the widths of first, second, and third slits 1a, 2a, and 3a of the first second, and third trim filters 1, 2, and 3 and the width of the slit 5c are adjusted in the color beam separating direction of the optical separator 15.

The light emitted from the light source 10 is separated into three beams, namely, a red beam R, a green beam G, and a blue beam B, by the optical separator 15. The optical separator 15 may be constructed to have first, second, and third dichroic filters 15a, 15b, and 15c which are disposed aslant at different angles with respect to an optical axis of incident light. The optical separator 15 separates the incident light according to a predetermined wavelength range and outputs the separated light beams at different angles. For example, the first dichroic filter 15a reflects a beam giving the red wavelength range from white incident light and, at the same time, transmits beams giving the green and blue wavelength ranges. The second dichroic filter 15b reflects the G beam and, at the same time, transmits the B beam. The third dichroic filter 15c reflects the B beam transmitted by the first and second dichroic filters 15a and 15b.

The R, G, and B beams which were separated according to wavelength via the first, second, and third dichroic filters 15a, 15b, and 15c are then reflected at different angles. For example, the R and B beams are focused with the G beam therebetween, and the R, G and B beams are incident on the scrolling unit 20.

Figure 7A:
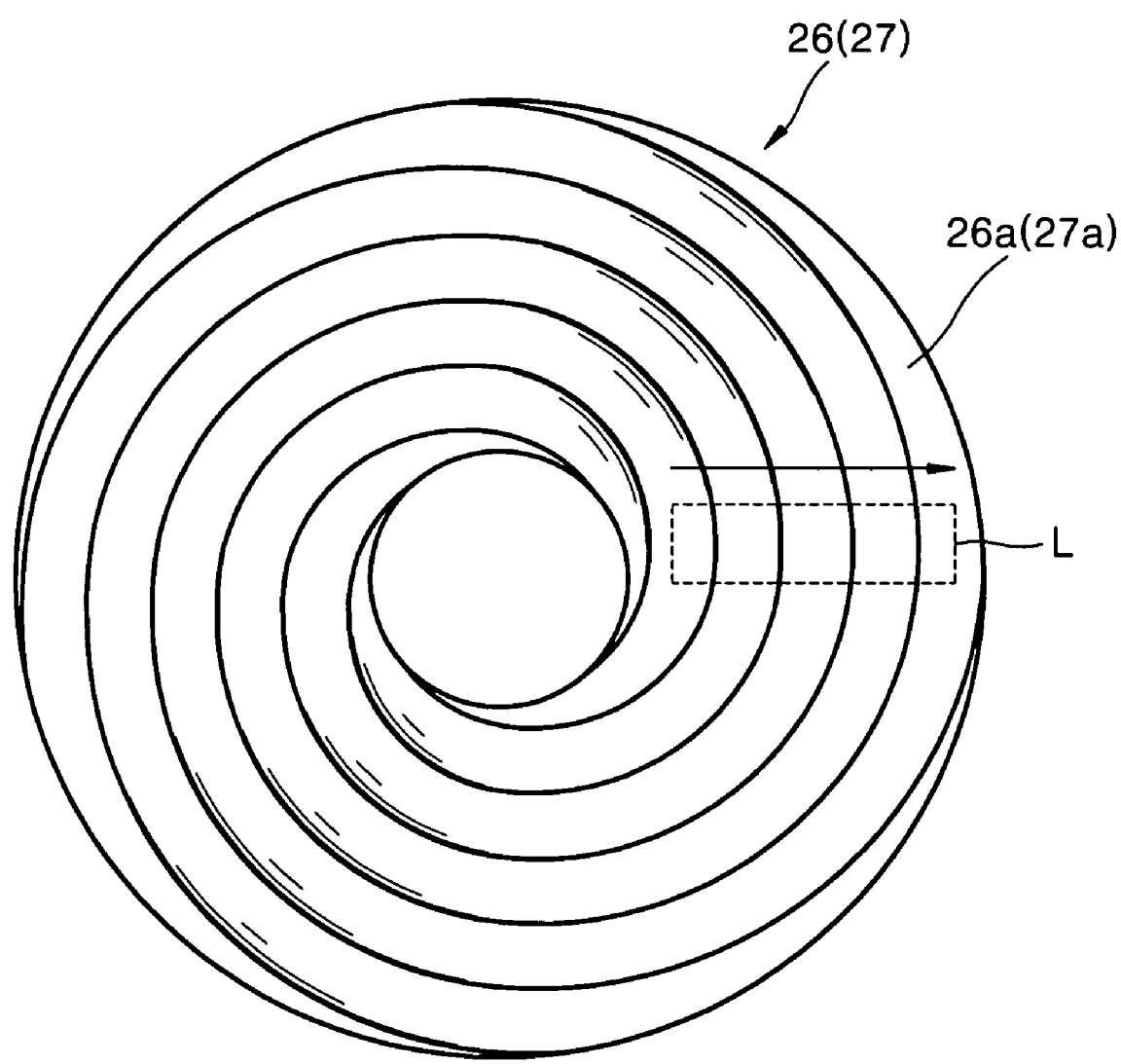
FIG. 7A is a front view of a spiral lens disc used in the projection system according to the first embodiment of the present invention.
Figure 7B:
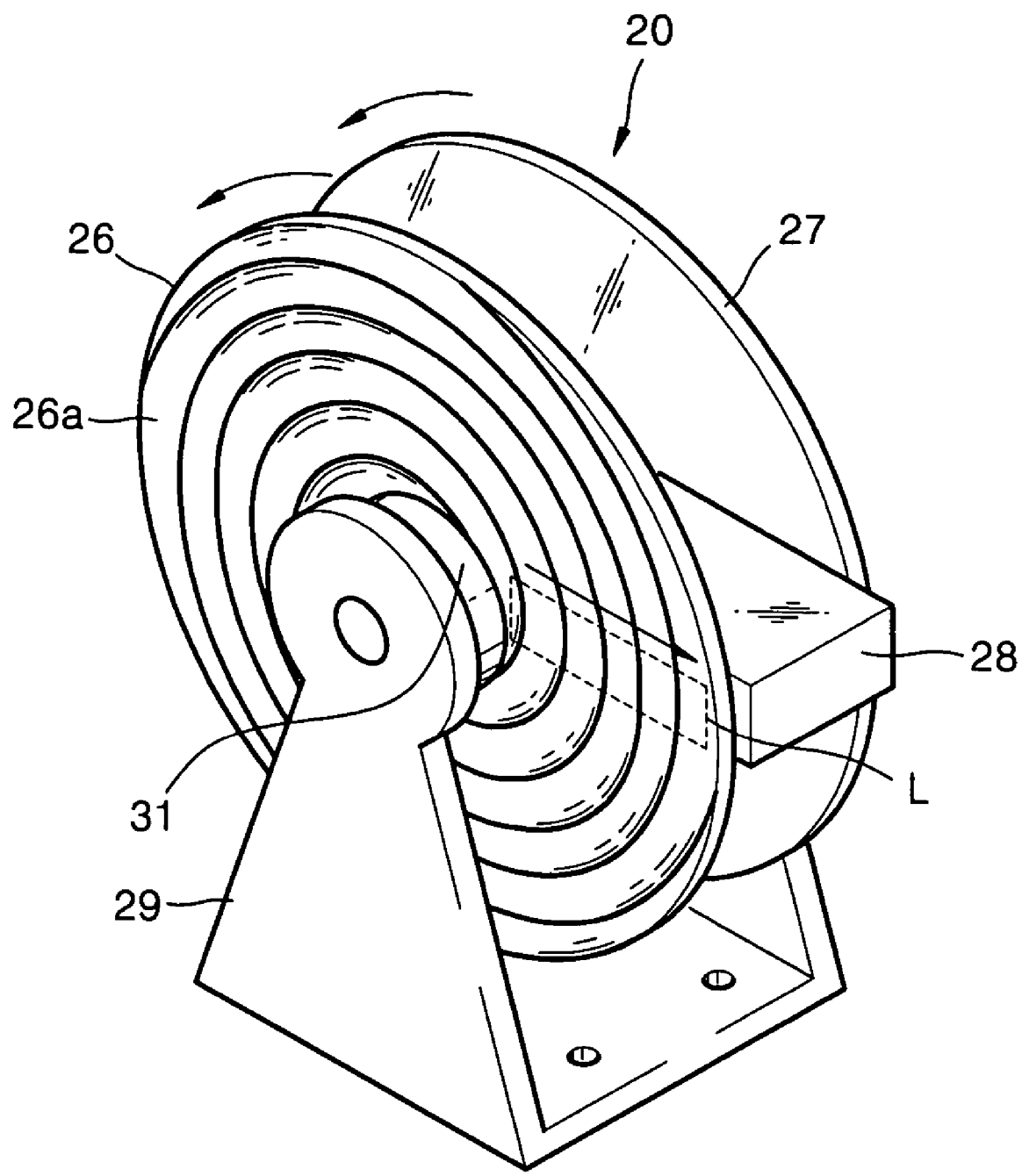
FIG. 7B illustrates a first example of a scrolling unit used in the projection system according to the first embodiment of the present invention.

The scrolling unit 20 may include one or more spiral lens discs. In FIG. 4, the scrolling unit 20 includes one spiral lens disc. Here, the spiral lens disc is formed by spirally arranging cylindrical lens cells 20*a*. However, as shown in FIGS. 7A and 7B, the scrolling unit may include first and second spiral lens discs 26 and 27 which are disposed to be separated from each other, and a glass rod 28 disposed between the first and second spiral lens discs 26 and 27.

The first and second spiral lens discs 26 and 27 are formed by spirally arranging cylindrical lens cells 26*a* and 27*a* on at least one surface thereof, and move rotatably. Further, the cross-section of the first and second spiral lens discs 26 and 27 has a cylindrical lens array structure. The first and second spiral lens discs 26 and 27 are supported by a bracket 29 to rotate at a uniform speed by a driving source 31.

As shown in FIG. 4, first and second cylindrical lenses 16 and 17 are disposed in front of and behind the scrolling unit 20, respectively. First and second fly eye lens arrays 34 and 35 and a relay lens 38 may be disposed between the second cylindrical lens 17 and the light valve 40.

The width of the light incident on the scrolling unit 20 is reduced by the first cylindrical lens 16 so that the light loss is reduced. Further, the width of the light passing through the scrolling unit 20 returns to its original width by the second cylindrical lens 17.

Hereinafter, the operation of the projection system according to the first embodiment of the present invention configured as described above will be described.

The white light emitted from the light source 10 passes through the spatial filter 5 and the collimating lens 14 and is incident on the optical separator 15. The light incident on the optical separator 15 is separated into three beams, namely, R, G, and B beams by the first, second, and third dichroic filters 15*a*, 15*b*, and 15*c* and is incident on the scrolling unit 20. Here, the width of the light incident on the scrolling unit 20 is reduced by the first cylindrical lens 16.

Figure 8A:
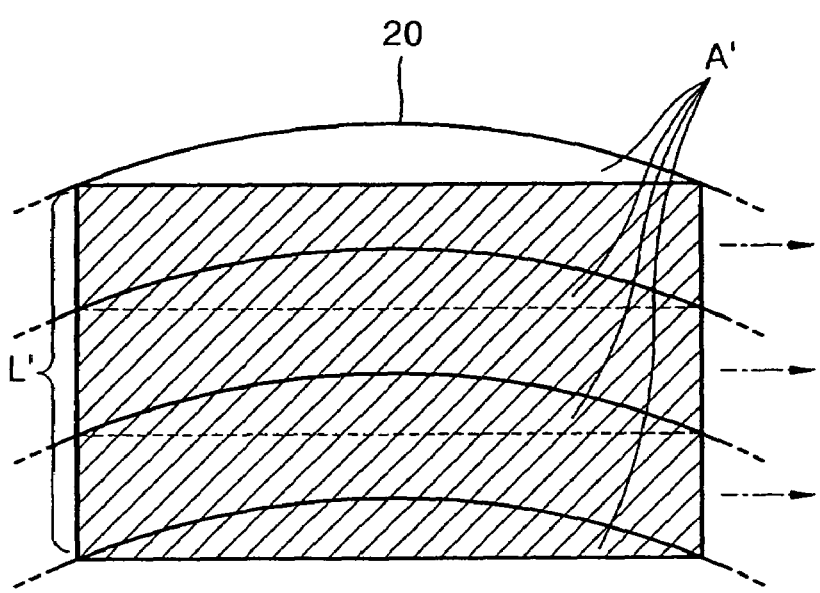
FIGS. 8A and 8B show a shape of light focused on the spiral lens disc depending on whether a cylindrical lens is used or not in the projection system according to the first embodiment of the present invention.
Figure 8B:
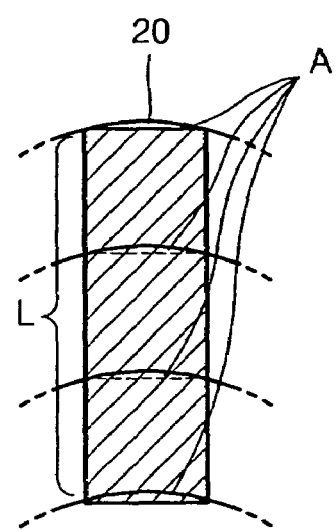

Referring to FIGS. 8A and 8B, a beam that is emitted from the light source 10 and is incident on the scrolling unit 20 without passing through the first cylindrical lens 16 is compared to a beam that has a width reduced by the first cylindrical lens 16 and then is incident on the scrolling unit 20. As shown in FIG. 8A, when the width of a beam passing through the scrolling unit 20 is relatively wide, the shape of a spiral lens array does not match that of a beam L', and thus light loss of an unmatched area A' for each color is caused. To minimize the light loss, preferably, the first cylindrical lens 16 is provided to reduce the width of the beam passing through the scrolling unit 20 so that the shape of the spiral lens array matches that of a beam L, as shown in FIG. 8B. Hence, if an unmatched area corresponding to when the width of the beam using the first cylindrical lens 16 is reduced is referred to as A, A is smaller than A'. Consequently, the light loss is reduced.

The width of the beam passing through the scrolling unit 20 returns to is original width via the second cylindrical lens 17.

The R, G, and B beams passing through the second cylindrical lens 17 are focused onto individual lens cells 34*a* and 35*a* of the first and second fly eye lens arrays 34 and 35. Subsequently, the R, G, and B beams focused onto the lens cells 34*a* and 35*a* are overlapped by the relay lens 38 ad focused onto the light valve 40, thereby forming a color bar.

Figure 9A:
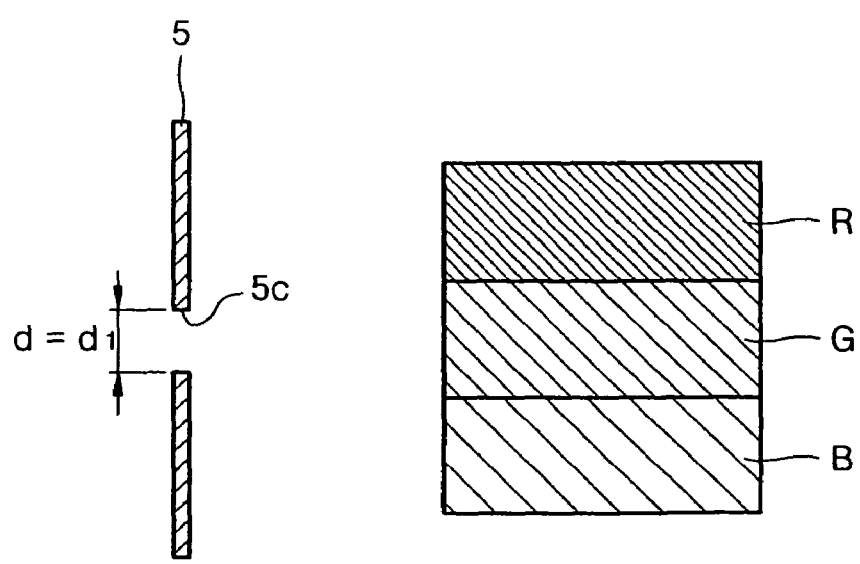
FIGS. 9A through 9C show color bars whose width changes according to the width of the slit of the spatial filter used in the present invention.
Figure 9B:
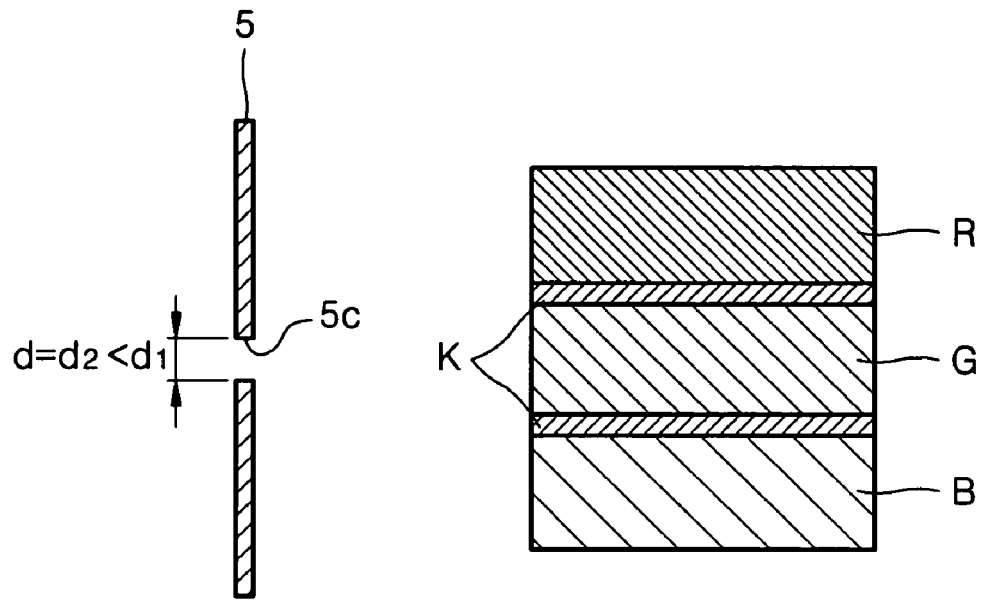
Figure 9C:
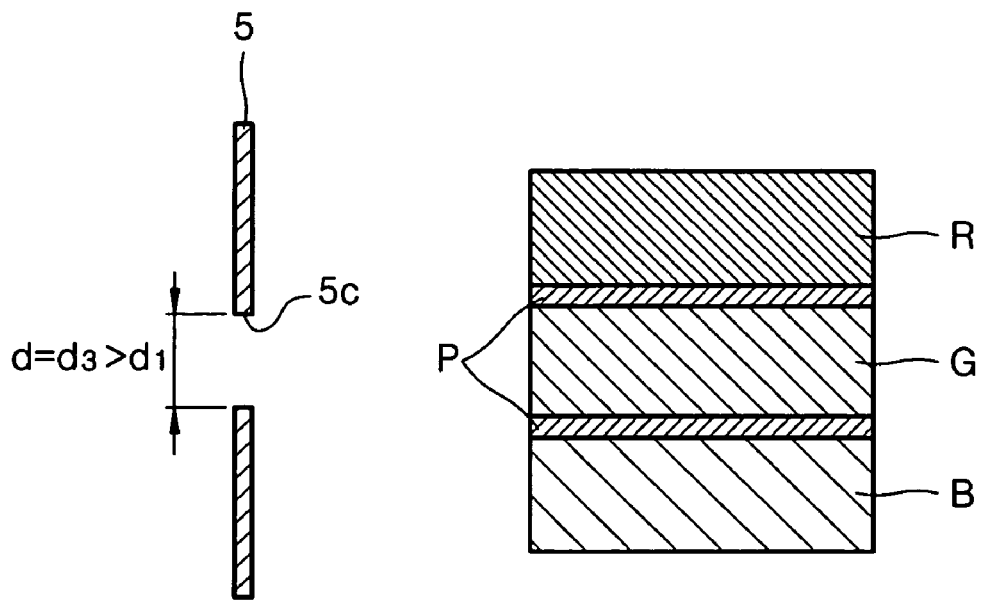

Referring to FIG. 9A, as the width d of slit 5*c* of the spatial filter 5 changes, the area of the color bar changes. For example, when the width d of the slit 5*c* is referred to as d1, and the color bar formed on the light valve 40 is divided into three areas, if the width d of the slit 5*c* changes to d2, which is less than d1 (d1>d2), as shown in FIG. 9B, black bars K form between the divided color bars. Further, if the width d changes to d3, which is greater than d1 (d1<d3), as shown in FIG. 9C, the area of the color bars increase so that portions P where the color bars overlap with each other are formed.

However, the first, second, and third trim filters 1, 2 and 3 are provided with the spatial filter 5 in the first embodiment of the present invention, and thus the area of the color bars formed on the light valve 40 can be changed. The first, second, and third trim filters 1, 2, and 3 have the first, second, and third slits 1*a*, 2*a*, and 3*a* having a predetermined width, reflect and transmit color beams. In FIG. 6A, only the first trim filter 1 is provided with spatial filter 5. For example, the first trim filter 1 reflects G beam and transmits the remaining beams, namely R and B beams. The slit 1*a* of the first trim filter 1 has a width dG that is less than a width d of the slit 5*c* of the spatial filter 5. The light emitted from the light source 10 passes through the slit 5*c* of the spatial filter 5 and then passes through the first trim filter 1. When the light emitted from the light source 10 passes through the first trim filter 1, all of the R, G, and B beams pass through the first slit 1*a*, but the first trim filter 1 reflects the G beam and transmits the R and B beams.

Here, the widths of the R and B beams passing through the first trim filter 1 are determined by the width of the slit 5*c* of the spatial filter 5, and the width of the G beam is determined by the width dG of the first slit 1*a*. If the width dG of the first slit 1*a* is less than that of the slit 5*c*, the width of the G beam is reduced by the first trim filter 1 so that the width of the G beam is less than that of the R and B beams. In this case, as shown in FIG. 6A, the black bars K may be formed between the R and G beams and between the B and G beams.

Further, as shown in FIG. 6B, the first and second trim filter 1 and 2 are provided with the spatial filter 5. For example, the second trim filter 2 may be configured to reflect the B beam and transmit the R and G beams. The second slit 2*a* of the second trim filter 2 has a width dB less than or equal to that of the first slit 1*a*. If the width dB of the second slit 2*a* is equal to the width dG of the first slit 1*a*, the B and G beams have the same width. The width of each of the color bars can be adjusted by adjusting the width of the slit 5*c* of the spatial filter 5 and the widths of the first and second slits 1*a* and 2*a*. As shown in FIG. 6B, the black bars K can be generated, or the area of each of the color bars can be adjusted without generating the black bars K, by adjusting the width of the slit 5*c* and the widths of the first and second slits 1*a* and 2*a*.

Further, as shown in FIG. 6C, the first, second, and third trim filters 1, 2, and 3 are provided. For example, the first trim filter 1 reflects the G beam, the second trim filter 2 reflects the B beam, and the third trim filter 3 reflects the R beam. If the first, second, and third trim filter 1, 2, and 3 are provided, the spatial filter 5 may not be provided.

When the widths of the first, second, and third slits 1*a*, 2*a*, and 3*a* of the first, second, and third trim filters 1, 2, and 3 are referred to as dG, dB, and dR, the areas of the R, G, and B color bars are the same in a case where the widths dG, dB, and dR are the same. When the width dG, dB, and dR satisfy the relationship of dB<dG<dR, as shown in FIG. 6C, the areas of the B, G, and R color bars change in order of the B, G, and R color bars. The areas of the B, G, and R color bars can be adjusted according to the widths of the slits of the first, second, and third trim filters 1, 2, and 3. In other words, the width of the G color bar is determined by the width dG of the first slit 1a, the width of the B color bar is determined by the width dB of the second silt 2a, and the width of he R color bar is determined by the width dR of the third slit 3a.

The area of each of the color bars focused on the light valve 40 is adjusted by the spatial filter 5 and the first through third trim filters 1, 2, and 3, and a color image is formed on the light valve 40 according to an image signal.

Figure 10A:
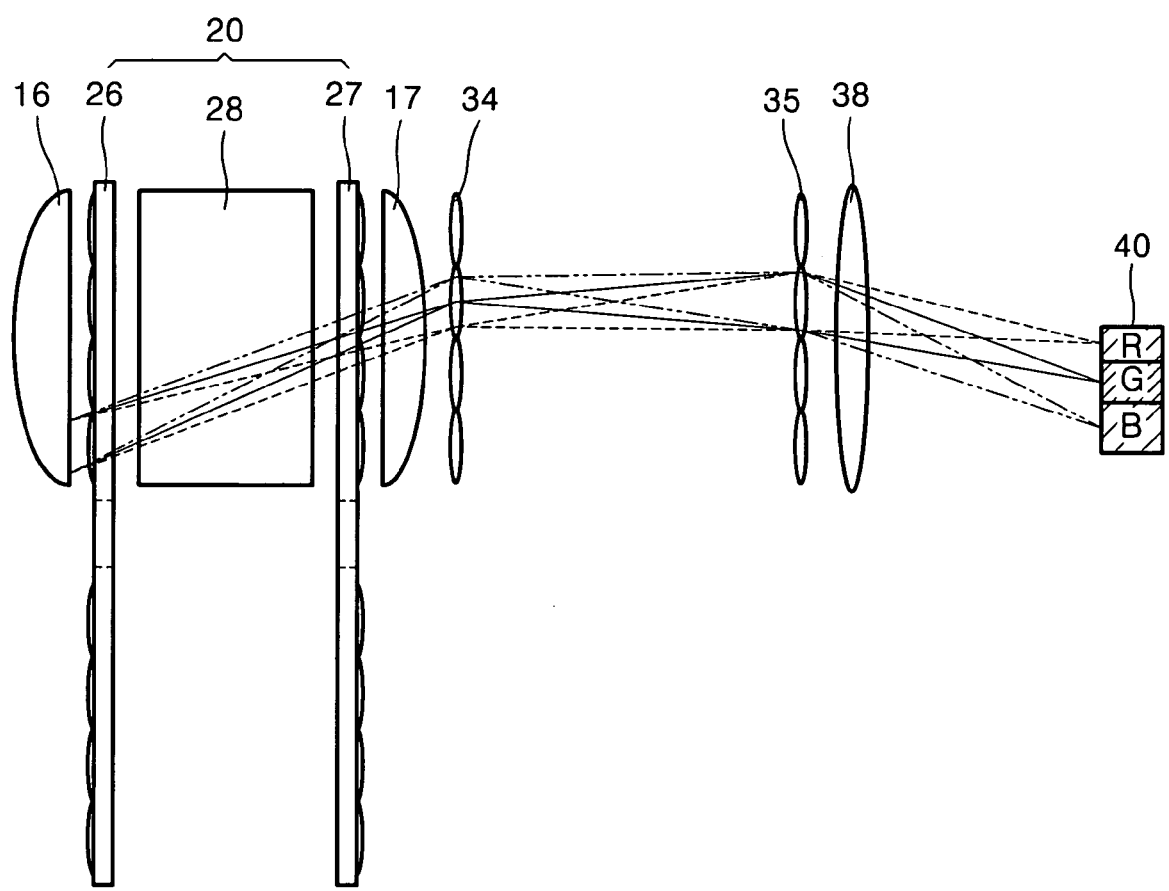
FIGS. 10A through 10C illustrate a process of performing the scrolling operation of the projection system according to the first embodiment of the present invention.
Figure 10B:
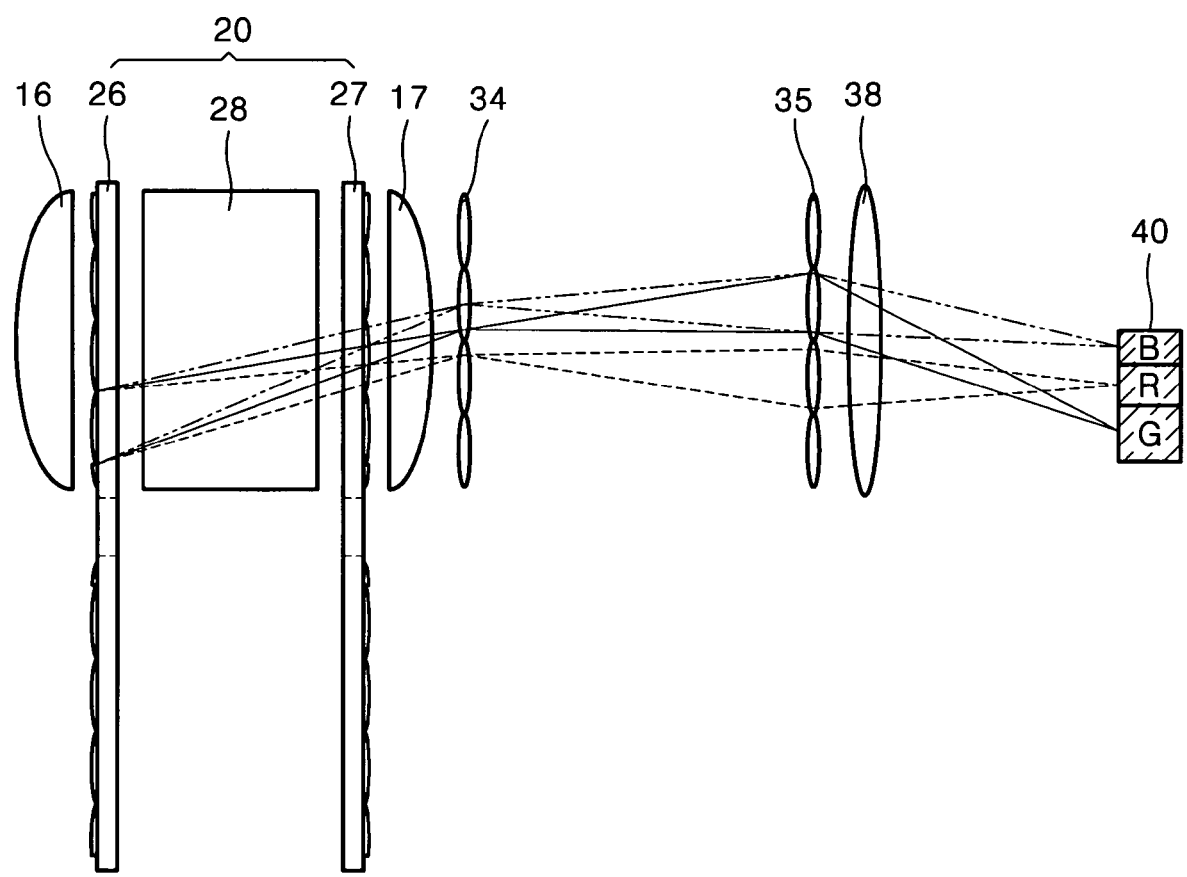
Figure 10C:
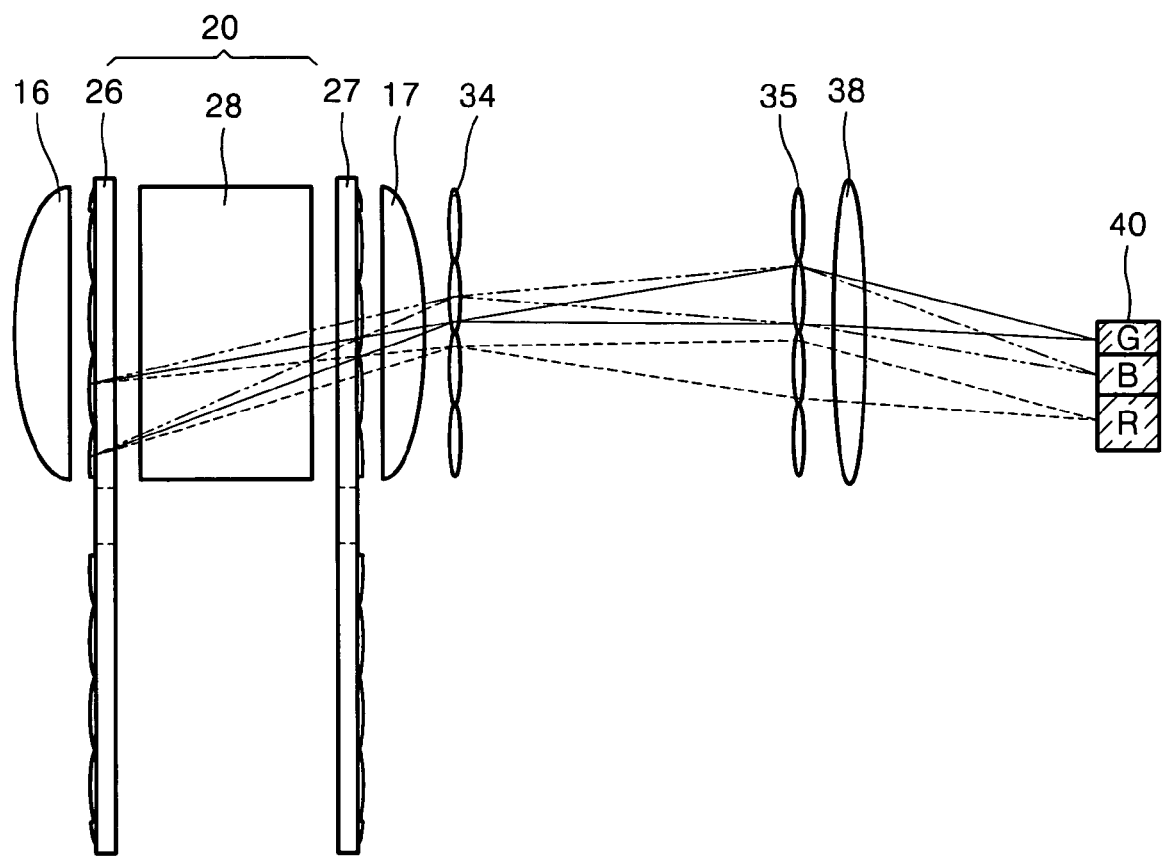

Next, the scrolling operation of the color bars formed on the light valve 40 will be described. As shown in FIGS. 10A through 10C, the color bars are periodically scrolled, for example, in an (R, G, B), (B, R, G), and (G, B, R) order due to the rotation of the scrolling unit 20. In FIGS. 10A through 10C, the scrolling unit 20 includes the first and second spiral lens discs 26 and 27 and the glass rod 28.

As shown in FIG. 10A, light passes through the first spiral lens disc 26, the glass rod 28, the second spiral lens disc 27, the second cylindrical lens 17, the first and second fly eye lens arrays 34 and 35, and the relay lens 38 and forms color bars on the light valve 40 in an R, G, and B order. Next, as the first and second spiral lens discs 26 and 27 rotate, the lens surface of the first and second spiral lens discs 26 and 27 gradually moves upward or downward while the light passes through the first and second spiral lens discs 26 and 27. As the first and second spiral lens discs 26 and 27 move, color bars in a B, R, and G order as shown in FIG. 10B are formed. Sequentially, as the first and second spiral lens discs 26 and 27 rotate, color bars in a G, B, and R order as shown in FIG. 10C are formed.

Such a scrolling operation is repeated as the first and second spiral lens discs 26 and 27 rotate. In other words, the locations of lenses on which beams are incident change according to the rotation motion of the first and second spiral lens discs 26 and 27, and the rotation of the first and second spiral lens discs 26 and 27 is converted into a rectilinear motion of a cylinder lens array at the cross-section of the first and second spiral lens discs 26 and 27 so that scrolling is performed.

Thereafter, the beams passing through the second cylindrical lens 17 are overlapped by the first and second fly eye lens arrays 34 and 35 and are focused on the light valve 40, thereby forming an individual color bar. Further, the first and second fly eye lens arrays 34 and 35 make the intensity of light irradiated on the light valve 40 uniform. The relay lens 38 transfers the beams passing through the first and second fly eye lens arrays 34 and 35 to a predetermined position, for example, the light valve 40.

Since the areas of the color bars are adjusted using the spatial filter 5 or the first through third trim filters 1, 2, and 3 in forming the color image through the scrolling operation, various color temperature and color gamut can be realized. Further, since the areas of the color bars are reduced so that black bars are formed between the color bars as needed, the image signal can be processed smoothly.

Figure 11:
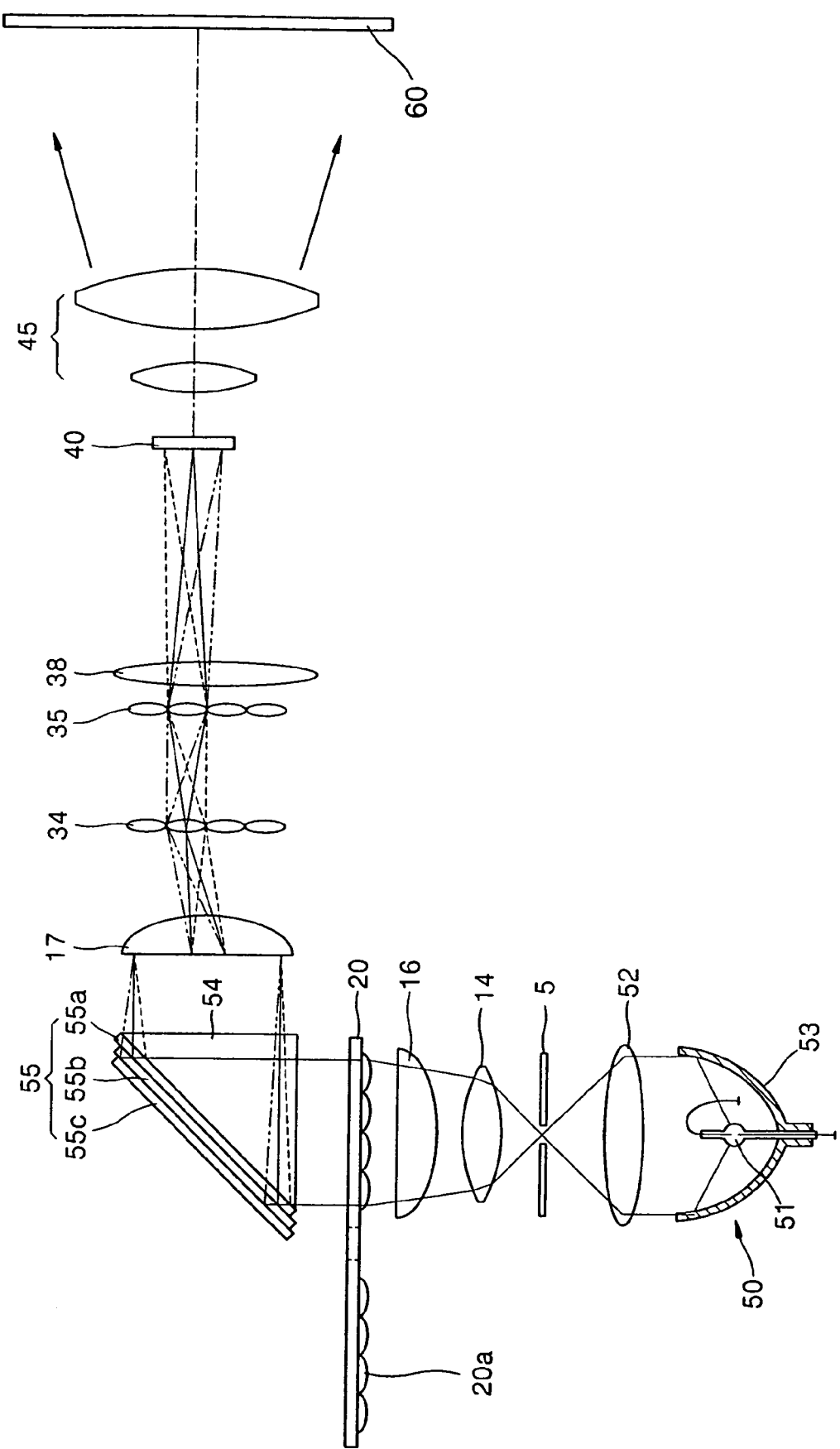
FIG. 11 illustrates the schematic structure of a projection system according to a second embodiment of the present invention.

A projection system according to a second embodiment of the present invention, as shown in FIG. 11, includes a light source 50, a spatial filter 5, a scrolling unit 20, an optical separator 55, and a light valve 40. The spatial filter 5 is installed on a focal surface of light emitted from the light source 50 and can adjust the divergent angle or the etendue of incident light. The scrolling unit 20 focuses light passing through the spatial filter 5 at different locations. The optical separator 55 separates light passing through the scrolling unit 20 according to color of incident light. The light valve 40 processes beams separated by the optical separator 55 according to an input image signal and forms a color image.

The light source 50 includes a lamp 51 for producing light and a reflecting mirror 53 for reflecting light emitted from the lamp 51 and guiding a travelling path of the light. The reflecting mirror 53 may be an elliptic mirror in which a position of the lamp 51 is a first focal point and a point where light is focused is a second focal point. Further, the reflecting mirror 53 may be a parabolic mirror in which a position of the lamp 51 is a focal point and which makes light, which is emitted from the lamp 51 and is reflected from the reflecting mirror 53, into parallel light. In FIG. 11, a parabolic mirror is used as the reflecting mirror 53.

A focusing lens 52 is disposed between the light source 50 and the spatial filter 5 and focuses incident light. A collimating lens 14 is disposed between the spatial filter 5 and the optical separator 55 and makes incident light into parallel light. In a case where the parabolic mirror is used as the reflecting mirror 53 as in FIG. 11, the focusing lens 52 must be further provided compared to the elliptic mirror. Further, a first cylindrical lens 16 is provided in front of the scrolling unit 20 so as to reduce the width of light incident on the scrolling unit 20.

The scrolling unit 20 may be configured to include one or more spiral lens discs. As described in the above first embodiment, the scrolling unit 20 may include one spiral lens disc or may include two spiral lens discs and a glass rod.

The optical separator 55 includes first, second, and third dichroic filters 55a, 55b, and 55c that transmit and reflect incident light according to color of the incident light and are parallel to one another. Light passing through the scrolling unit 20 travels as convergent beams at different angles according to an incident location of a cylindrical lens cells 20a. Then, the convergent beams are reflected at different locations according to color of the incident light by the first, second, and third dichroic filters 55a, 55b, and 55c. A prism 54 is provided between the scrolling unit 20 and the optical separator 55 such that incident light travels to the optical separator 55 without changing an optical path of the incident light.

It is preferable that a second cylindrical lens 17, first and second fly eye lens arrays 34 and 35, and a relay lens 38 are provided on an optical path between the optical separator 55 and the light valve 40. The second cylindrical lens 17 returns the width of the light reduced by the first cylindrical lens 16 to its original width. Since the structure and operation of the first and second fly eye lens arrays 34 and 35 and the relay lens 38 are the same as those of the first embodiment, their description will be omitted.

In the second embodiment of the present invention, the spatial filter 5 can reduce the width of each of the color bar formed on the light valve 40 as in the first embodiment. The width of a slit of the spatial filter 5 can be adjusted as described in the first embodiment. The projection system according to the second embodiment may include one or more trim filters as well as the spatial filter 5 as in the first embodiment. The spatial filter 5 can adjust the width of each of the color bars to be the same size, while the trim filters can independently adjust the width of each of the color bars.

A projection system according to a third embodiment of the present invention is characterized in that a rod optical pipe is used as an optical separator which separates light emitted from a light source according to color of the light.

Figure 12:
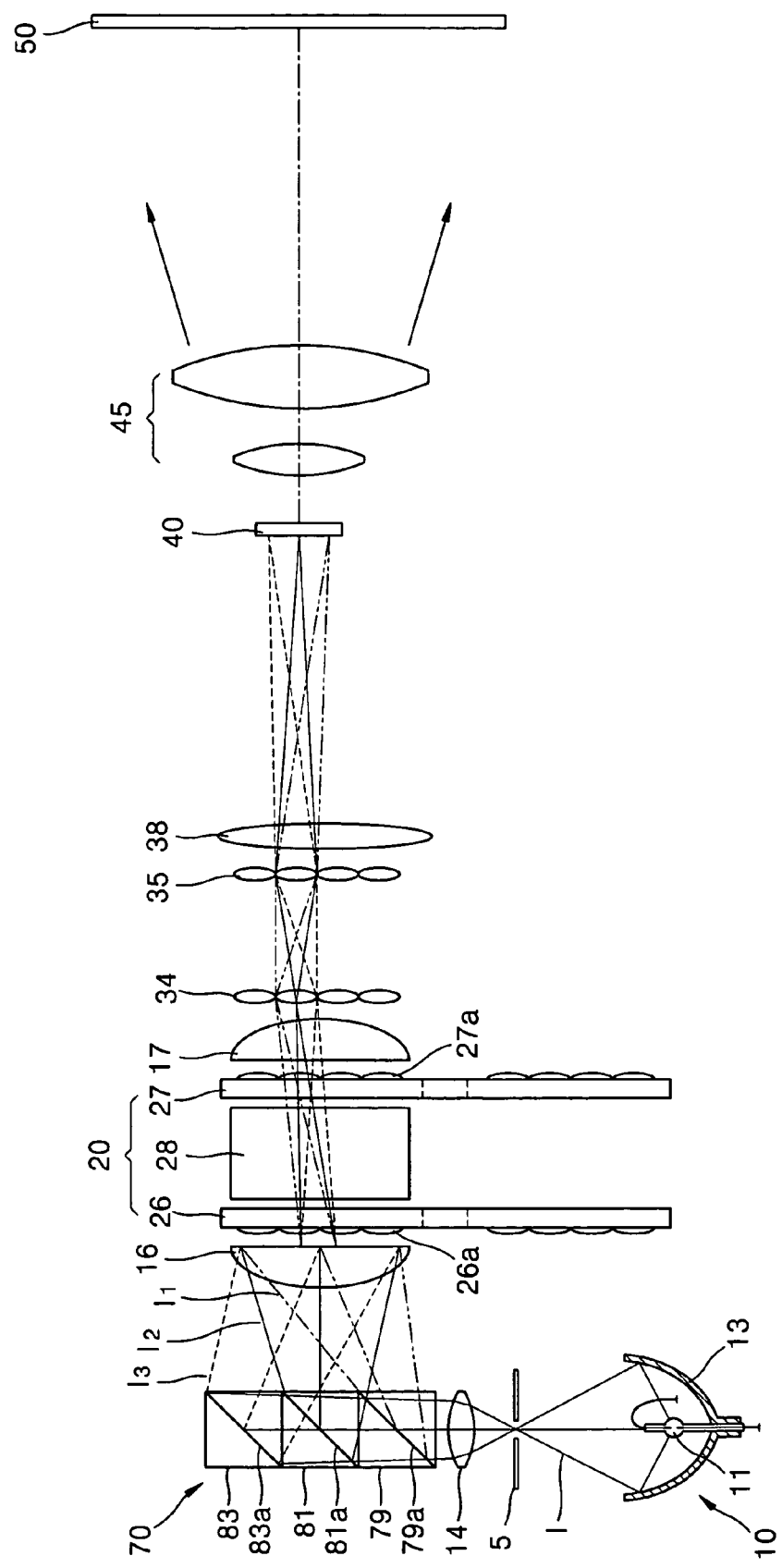
FIG. 12 illustrates the schematic structure of a projection system according to a third embodiment of the present invention.

Referring to FIG. 12, the projection system includes a light source 10, a spatial filter 5, an optical pipe 70, a scrolling unit 20, and a light valve 40. The spatial filter can adjust the divergent angle or the etendue of light I emitted from the light source 10. The optical pipe 70 separates incident light according to color of the incident light. The scrolling unit 20 makes beams separated by the optical pipe 70 to travel at different angles and scrolls color bars due to the rotation thereof. The light valve 40 processes the beams separated by the optical pipe 70 according to an input image signal and forms a color image.

First and second cylindrical lenses 16 and 17 are disposed in front of and behind the scrolling unit 20, respectively. First and second fly eye lens arrays 34 and 35 and relay lens 38 are disposed on an optical path between the scrolling unit 20 and the light valve 40.

It is preferable that a collimating lens 14 is disposed on an optical path between the spatial filter 5 and the optical pipe 70.

The optical pipe 70 includes first, second, and third dichroic prisms 79, 81, and 83 which reflect a beam with a specific wavelength and transmit a beam with wavelength other than the specific wavelength so that incident light is separated into first, second, and third color beams $I_1$, $I_2$, and $I_3$ The first dichroic prism 79 has a first dichroic filter 79a, and the first dichroic filter 79a reflects the first color beam $I_1$ from incident light and transmits the second and third color beams $I_2$ and $I_3$. For example, the first dichroic filter 79a reflects a red beam and transmits green and blue beams.

The second dichroic prism 81 is attached to the first dichroic prism 79 and has a second dichroic filter 81a. The second dichroic filter 81a reflects the second color beam $I_2$, for example, a green beam from the incident light and transmits a remaining beam.

The third dichroic prism 83 is attached to the second dichroic prism 81 and has a third dichroic filter 83a. The third dichroic filter 83a reflects the third color beams $I_3$, for example, a blue beam from the incident light and transmits a remaining beam. The third dichotic filter 83a may be replaced with a total reflection mirror that can reflect all color beams of the incident light.

The optical pipe 70 is suitable for a projection system using a micromirror device (not shown), which can produce an image irrespective of polarization feature of incident light, as the light valve 40.

Figure 13:
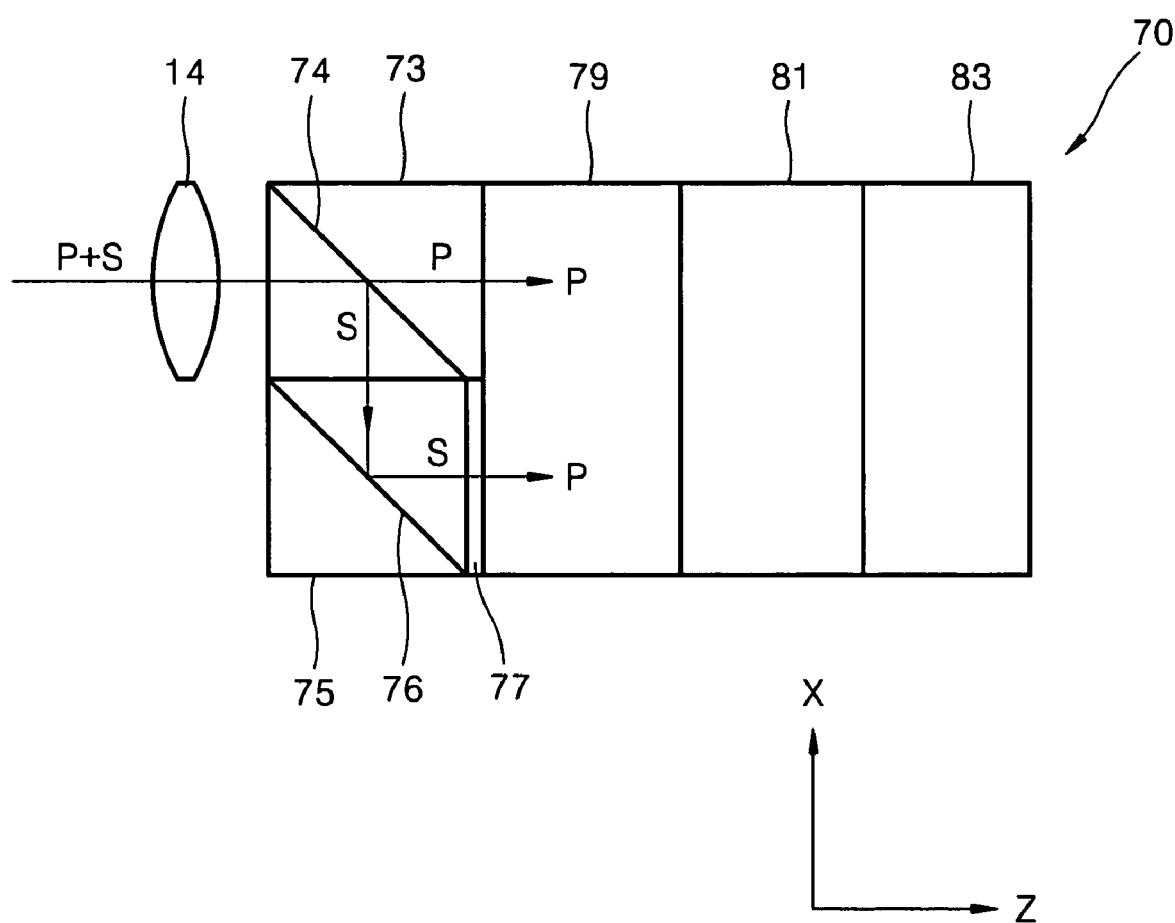
FIG. 13 shows an example of a light pipe used in the projection system according to the third embodiment of the present invention.

Meanwhile, the optical pipe 70, as shown in FIG. 13, may further include first and second polarizing beam splitters 73 and 75 which are disposed in up and down directions with respect to a travelling direction of light in front of the first dichroic prism 79, and a half-wavelength plate 77 which is adjacently installed to the second polarizing beam splitter 75 and changes a polarization direction of light.

The first polarizing beam splitter 73 is installed on an incident surface of the first dichroic prism 79. The first polarizing beam splitter 73 transmits first light with one polarization direction of non-polarized white light and reflects second light with another polarization direction so that the first light travels toward the first dichroic prism 79 and the second light travels toward the second polarizing beam splitter 75. For this, the first polarizing beam splitter 73 includes a first polarization filter 74.

As shown in FIG. 13, in a case where white light in which P-polarized light and S-polarized light are mixed is emitted from the light source 10, the first polarization filter 74 transmits the P-polarized light and reflects the S-polarized light.

The second polarizing beam splitter 75 again reflects the second light reflected from the first polarizing beam splitter 73 such that the second light travels toward the first dichroic prism 79. The second polarizing beam splitter 75 changes only an optical path of the S-polarized light without changing the feature of the S-polarized light itself. Thus, the second light passing through the second polarizing beam splitter 75 is made parallel to the first light passing through the first polarizing beam splitter 73. For this, the second polarizing beam splitter 75 includes a second polarization filter 76 which reflects a specific polarized light, for example, the S-polarized light from incident light. The second polarizing beam splitter 75 may be a total reflection mirror that can totally reflects light.

The half-wavelength plate 77 changes a phase of predetermined polarized light by 90°. Thus, the rectilinear polarization direction of the predetermined polarized light is changed into another rectilinear polarization direction. As shown in FIG. 13, the half-wavelength plate 77 is disposed between the second polarizing beam splitter 75 and the first dichroic prism 79 and changes the polarization direction of the second light to be the same as that of the first light. That is, the half-wavelength plate 77 changes the polarization direction of the S-polarization light reflected from the second polarization filter 76 to be the same as the polarization direction of the P-polarized light.

The half-wavelength plate 77 may be disposed between the first polarizing beam splitter 73 and the first dichroic prism 79 instead of being disposed between the second polarizing beam splitter 75 and the first dichroic prism 79 so that the polarization direction of the first light may be changed to be the same as that of the second light. By using the half-wavelength plate 77, all color beams emitted from the light source 10 can be employed, thereby increasing the optical efficiency.

Polarized light, for example, P-polarized light passing through the first and second polarizing beam splitters 73 and 75 and the half-wavelength plate 77 is separated according to wavelength by the first, second, and third dichroic prisms 79, 81, and 83. The first, second, and third dichroic prisms 79, 81, and 83 separate incident light according to wavelength by the first, second, and third dichroic filters 79a, 81a, and 83a as described with reference to FIG. 12.

The optical pipe of the third embodiment using polarized light can be applied to a projection system in which a liquid crystal display (LCD) or liquid crystal on silicon (LCOS) is used as the light valve 40.

In FIG. 12, the scrolling unit 20 includes first and second spiral lens discs 26 and 27 and a glass rod 28. As the first and second spiral lens discs 26 and 27 rotate, color bars formed on the light valve 40 are scrolled and a color image is formed. The color image thus formed is magnified by a projection lens unit 45 and the magnified color image is projected on a screen 60.

As described above, a projection system according to the present invention separates incident light according to color of the incident light by adjusting the etendue of the projection system or a divergent angle of the incident light using a spatial filter, thereby improving the quality of an image. In other words, overlapping portions between color bars occur because light emitted from a light source diverges beyond an acceptance angle of an optical system. Thus, since the spatial filter removes light beyond the acceptance angle in the present invention, the overlapping portions can be removed.

According to the present invention, since the spatial filter and a trim filter adjust the areas of the color bars, color gamut can be improved and balance of the color bars can be adjusted without any loss of light. Further, since a plurality of spatial filters for each of the color bars is not required, the areas of the color bars are adjusted using one spatial filter and a color image is formed using one scrolling unit, so that the size of the projection system can be reduced.

While the present invention has been particularly shown and described with reference to exemplary embodiments thereof, it will be understood by those of ordinary skill in the art that various changes in form and details may be made therein without departing from the spirit and scope of the present invention as defined by the appended claims.

What is claimed is:

1. A projection system comprising:
   a light source;
   a spatial filter comprising a slit to adjust a divergent angle or etendue of light emitted from the light source;
   an optical separator which separates light passing through the spatial filter according to color;
   a scrolling unit comprising one or more spiral lens discs, which are formed by spirally arranging cylindrical lens cells, for rotating, and scrolling color beams separated by the optical separator;
   a light valve which processes light passing through the scrolling unit according to an image signal and forms an image;
   a projecting lens unit which magnifies the image formed on the light valve and projects the magnified image onto a screen;
   wherein the scrolling unit forms color bars on the light valve and the area of the color bars is adjusted using the spatial filter.

2. The projection system of claim 1, further comprising one or more trim filters which have a slit having a width less than a width of the slit of the spatial filter and a filter surface for transmitting and reflecting light according to color.

3. The projection system of claim 2, further comprising first and second fly eye lens arrays which are disposed on an optical path between the scrolling unit and the light valve.

4. The projection system of claim 3, further comprising a relay lens which is disposed between the second fly eye lens array and the light valve.

5. The projection system of claim 1, wherein a slit having a width different from a width of the slit of the spatial filter is formed on the spatial filter or a glass, and one or more trim filter surfaces for transmitting and reflecting light according to color are coated on the spatial filter or the glass.

6. The projection system of claim 1, wherein the optical separator comprises first, second, and third dichroic prisms having first, second, and third dichroic filters, respectively, which transmit and reflect incident light according to color.

7. The projection system of claim 6, wherein the optical separator further comprises:
   first and second polarizing beam splitters which are disposed in up and down directions in front of the first dichroic prism and transmit and reflect incident light according to a polarization direction of polarized light; and
   a half-wavelength plate which is disposed between the first polarizing beam splitter and the first dichroic prism or between the second polarizing beam splitter and the first dichroic prism and changes the polarization direction of polarized light.

8. The projection system of claim 1, wherein the scrolling unit comprises first and second spiral lens discs which are disposed to be spaced apart from each other by a predetermined distance, and a glass rod disposed between the first and second spiral lens discs.

9. The projection system of claim 1, wherein the spatial filter comprises first and second filter surfaces which are disposed to be spaced apart from each other by a predetermined distance and form the slit of the spatial filter having a predetermined width, first and second support plates which support the first and second filter surfaces, respectively, and a transfer screw which moves the first and second support plates to adjust the width of the slit of the spatial filter.

10. The projection system of claim 1, further comprising a collimating lens which is disposed on an optical path between the light source and the optical separator and makes incident light into parallel light.

11. The projection system of claim 1, further comprising first and second cylindrical lenses which are disposed in front of and behind the scrolling unit, respectively.

12. The projection system of claim 1, further comprising first and second fly eye lens arrays which are disposed on an optical path between the scrolling unit and the light valve.

13. The projection system of claim 12, further comprising a relay lens which is disposed between the second fly eye lens array and the light valve.

14. The projection system of claim 1, wherein the width of the slit of the spatial filter or a width of a slit of one or more trim filters are adjusted in a color beam separating direction.

15. The projection system of claim 1, wherein the optical separator comprises first, second, and third dichroic filters which transmit and reflect incident light according to color and which are disposed aslant at different angles.

* * * * *